United States Patent [19]

Thompson

[11] Patent Number: 4,470,312
[45] Date of Patent: Sep. 11, 1984

[54] TORQUE MEASURING DEVICE

[75] Inventor: Douglas Thompson, Redmond, Wash.

[73] Assignee: The Boeing Company, Seattle, Wash.

[21] Appl. No.: 426,497

[22] Filed: Sep. 29, 1982

[51] Int. Cl.³ .............................................. G01L 3/00
[52] U.S. Cl. .................................. 73/862.08; 73/1 C
[58] Field of Search .......................... 73/862.08, 1 C

[56] References Cited

U.S. PATENT DOCUMENTS

| | | | |
|---|---|---|---|
| 2,352,779 | 7/1944 | Ehrenfeld | 73/51 |
| 2,648,219 | 8/1953 | Emery | 73/1 |
| 3,007,336 | 11/1961 | Livermont | 73/134 |
| 3,187,550 | 6/1965 | Bratton | 73/1 |
| 3,382,710 | 5/1968 | Aubeges et al. | 73/135 |
| 4,150,559 | 4/1974 | Levy | 73/1 |

FOREIGN PATENT DOCUMENTS 1113308  5/1968  United Kingdom .

OTHER PUBLICATIONS

Publication–"Mechanism For Recording Twisting Moment and Relative Tension Angle" by P. G. Artemov, V. 14, #12, Feb. 1971, pp. 244-246.

Primary Examiner—Gerald Goldberg
Assistant Examiner—Brian R. Tumm
Attorney, Agent, or Firm—Morris A. Case; B. A. Donahue

[57] ABSTRACT

A torque measuring device has a torsion bar with effective length adjustable to show different energy absorption capability. One end of the torsion bar's effective length is held stationary while a torque from a torque controlled winding tool is applied to the other end through a one direction of rotation clutch. The actual torque applied to the torsion bar is measured after which the torque on the bar is released.

6 Claims, 5 Drawing Figures

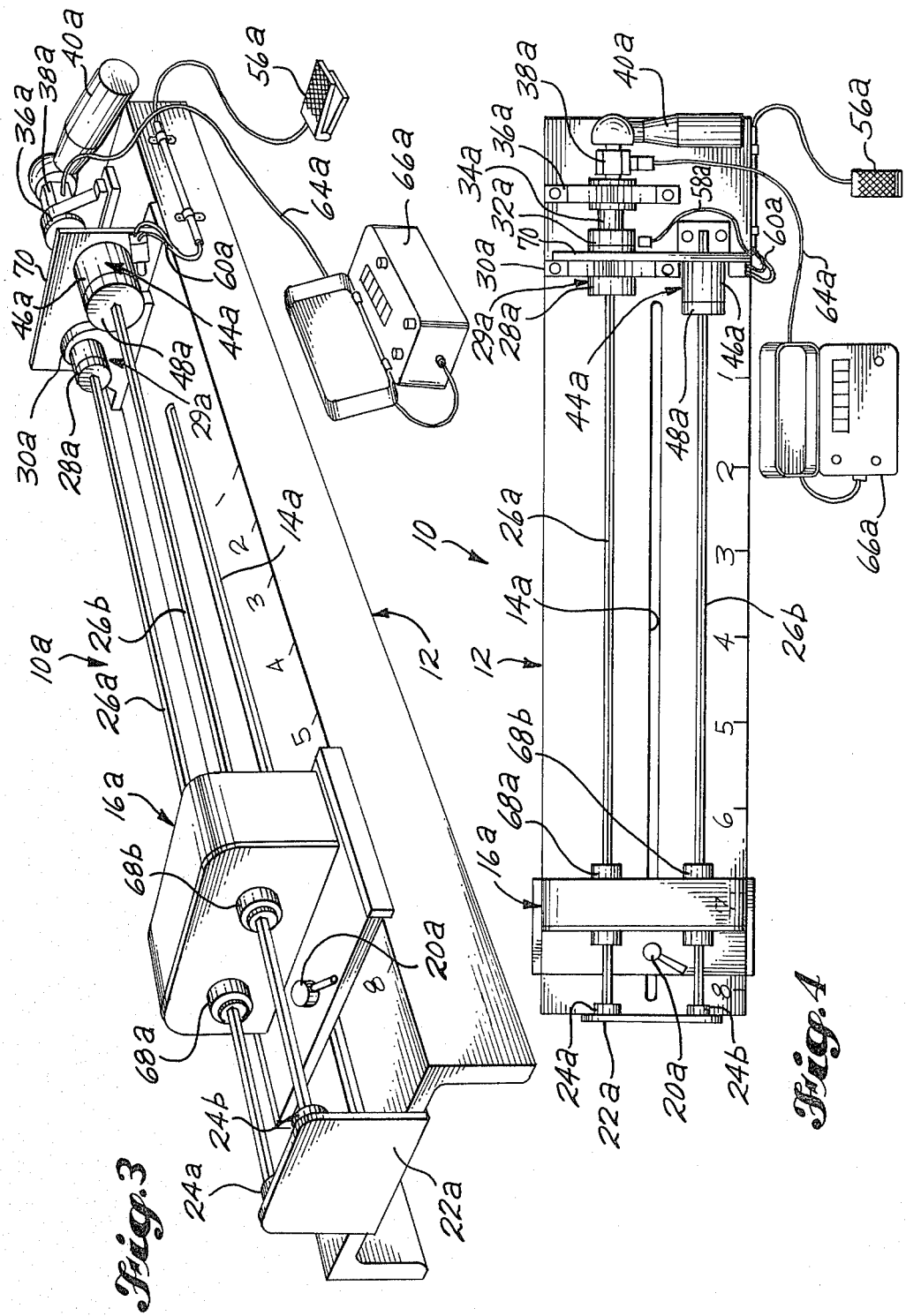

TORQUE MEASURING DEVICE

BACKGROUND OF THE INVENTION

Many types of fasteners require a specific torque range to be applied to insure properly setting the fastener. To assist in this there are winding tools that are set to apply a specific shut-off torque, and on some of the machines the shut-off torque may be adjusted within a specific range. One such tool is a nutrunner. On the adjustable nutrunners the desired torque is set and the unit will stop when that set torque is reached. Normally the nutrunners use a torque sensitive mechanical clutch which trips out when the torque setting is reached. Unfortunately, mechanical clutch nutrunners are in general especially sensitive to the "Joint Rate" of the fastener certification device which is used to adjust this clutch. This "Joint Rate" is defined as the energy absorption capability of the particular joint into which a fastener is installed. A particular nutrunner set to one torque will give a good solid join to a fastener used on a joint having one particular "Joint Rate" and will give an unsatisfactory join to a fastener having a different "Joint Rate."

It was found that a fastener certification device that is adjustable to reflect different absorption capability for a range of joints may be used to check on and to obtain the optium torque setting on a torque controlled winding tool that will insure a properly secured fastener regardless of the "Joint Rate."

SUMMARY OF THE INVENTION

A torque certification device has a torsion bar driven by a torque controlled winding tool through a clutch having a single direction of rotation. A second clutch mounted to a reciprocally adjustable movable support member holds the torsion bar in a manner to permit adjusting the effective length of the torsion bar while preventing rotation of the torsion bar when the clutch is engaged. A torque transducer mounted between the drive clutch and the winding tool registers the torque placed on the torsion bar. The second clutch when disengaged permits release of the torsional energy stored in the bar.

It is an object of this invention to provide a torque certification device to simulate and to show the actual torque applied to joints of varying rates.

DESCRIPTION OF THE DRAWINGS

FIG. 3 shows a perspective view of another embodiment of this invention.
FIG. 4 shows a plan view of the drawing of FIG. 3.

DETAILED DESCRIPTION

Figure 1:
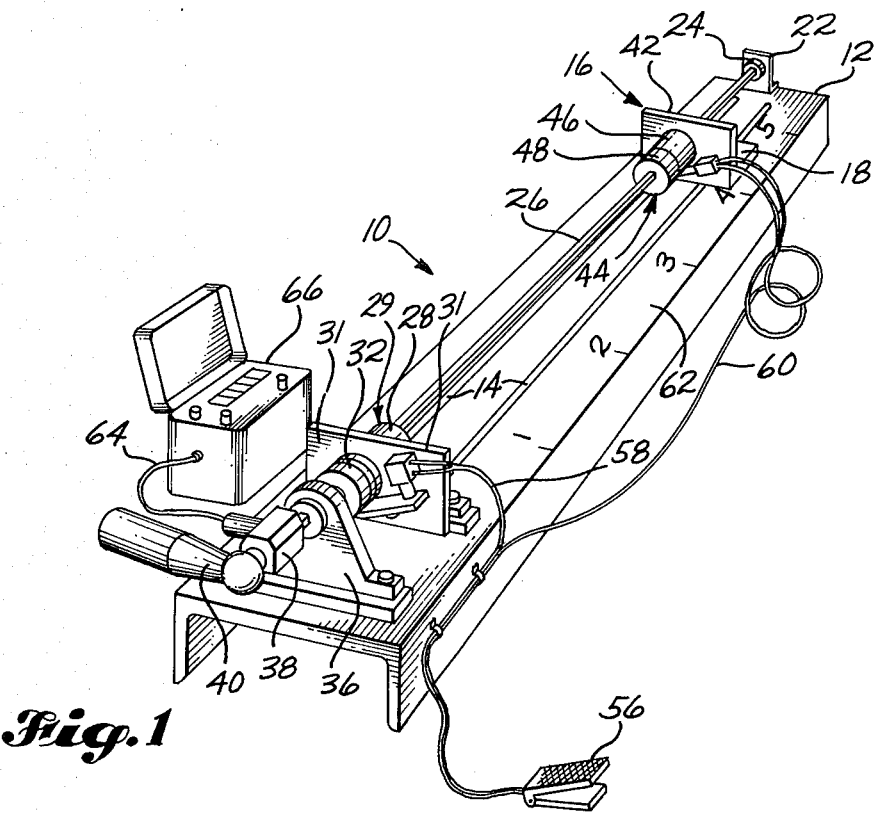
FIG. 1 shows a perspective view of the torque measuring device of this invention.

Certification device 10 has a frame 12. The frame has a pair of parallel elongated slots 14. Located over the area having the slots is an L-shaped movable support member 16. On the base 18, of the support member are a pair of lever arms 20, with each lever arm located to accept the end, not shown, of a bolt that extends up through the slots 14. This permits the lever arms to be loosened, the movable support member moved forward or backward to a desired location and the lever arms tightened to lock the movable support member in place. A stationary angled support 22 is secured near one end of the frame. The angled support has a hub 24, which is shaped to accept, support, and permit free rotation of an end of a torsion bar 26 while preventing end way movement of the bar. The torsion bar, which is preferably square in cross section, has the other end joined to the driven end 28 of a clutch 29 which is supported by pillow lock 30. Clutch 29 is mounted on support plate 31 which is anchored to prevent rotation. This clutch has a drive end 32 which will only rotate in a clockwise direction and is joined to a shaft 34. The shaft extends through a pillow block 36, and supports a torque transducer 38, before it ends in a socket for accepting a nutrunner 40. The torsion bar 26 extends through the upright part 42 of the movable support member 16, and also through a clutch 44. The driven end 46 of the clutch is secured to the movable support member, and the torsion bar slidingly engages the drive part 48. This is a close fit so that the torsion bar and the drive part of the clutch always move together. When this clutch is engaged it is in effect tied to the movable support member so that the clutch and the torsion bar will not rotate, but when the clutch is disengaged the driven part of the clutch and the torsion bar are free to rotate. With this set up the effective length of the torsion bar is the distance on the bar between the two clutches, and that length is established by the location of the movable support member.

Figure 5:
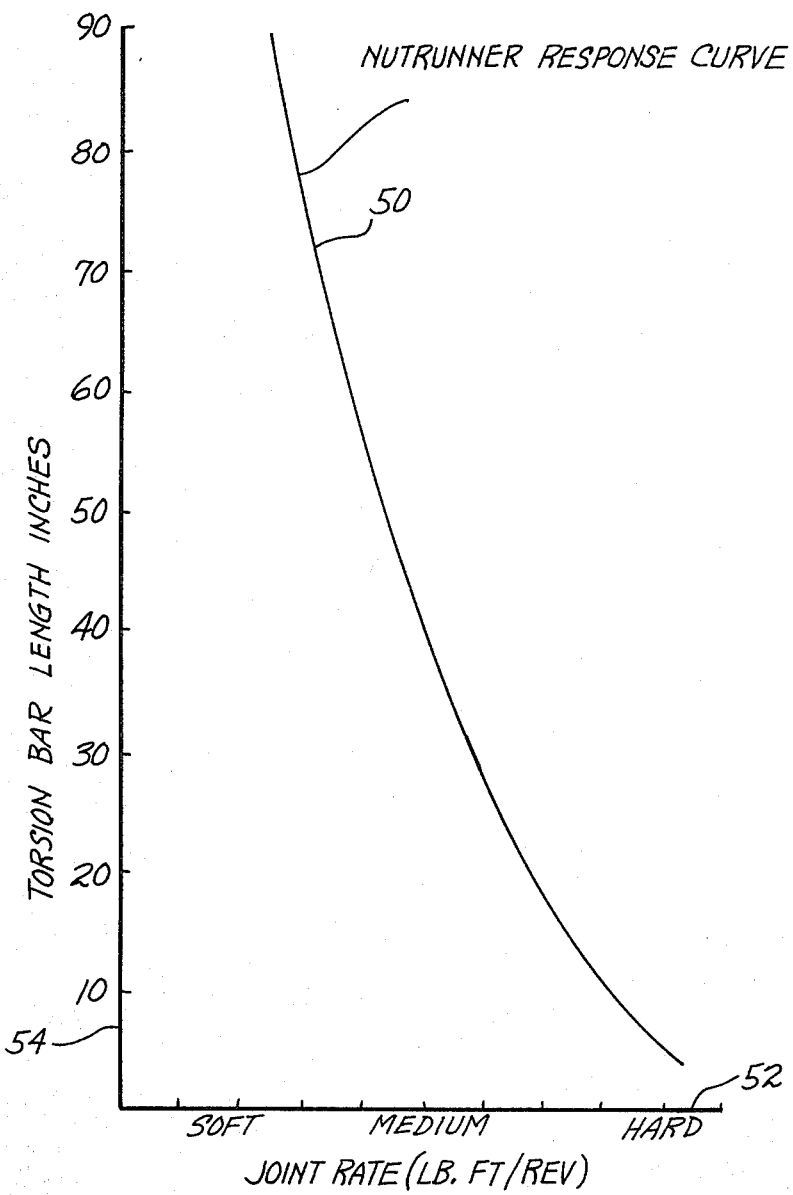
FIG. 5 is a graph of the Relative Joint Rate versus the effective length of a torque bar as used in this invention.

The energy absorption capability of a particular joint into which a fastener is installed has an influence on the effectiveness of the joint. This energy absorption capability or "Joint Rate" can be described as the "Angular rotation of the nut, from the surface contact position, to bring it to the required torque." This is stated as lbs ft per revolution. With a torque controlled winding tool, such as but not limited to a nutrunner, the tool when set to a certain torque may provide the correct torque to a nut being secured at one "Joint Rate," but be unsatisfactory for a nut being secured to joints having a different "Joint Rate." To obtain proper setting at the second "Joint Rate" a different torque setting is required on the tool. These tools usually are adjustable over a range of torque. It is a matter of setting the correct torque for the "Joint Rate" involved. The certification device 10, with the adjustable torque bar length, provides for testing at different "Joint Rates." FIG. 5 visually shows a curve 50 of "Joint Rate" 52 versus equivalent torsion bar length 54 on a nutrunner set for a specific torque.

The certification device 10 is controlled by a switch 56, which has lines 58 servicing the single direction of rotation clutch 29, and lines 60 servicing the second clutch 44. The movable support member 16 is adjusted opposite the numbers shown on the top 62 of frame 12 to reflect the effective length of the torsion bar 26 for the "Joint Rate" desired. Clutch 29 is not engaged so that the drive part 32 of that clutch rotates freely when driven by the nutrunner 40. When the control switch is depressed, it first energizes the second clutch 44, so that the torsion bar is held stationary by that clutch. The drive unit of clutch 29 is then engaged to put a torque on the torsion bar. The nutrunner shuts off when its set torque is reached, and the single direction of rotation clutch holds the torsion bar in the twisted position. The torque transducer 38 sends a signal through lines 64 to the registry box 66 where the applied torque is read. Next the switch is released which releases both clutches. When clutch 44 is released it permits the torsion bar to unwind, releasing energy stored in the bar.

Figure 2:
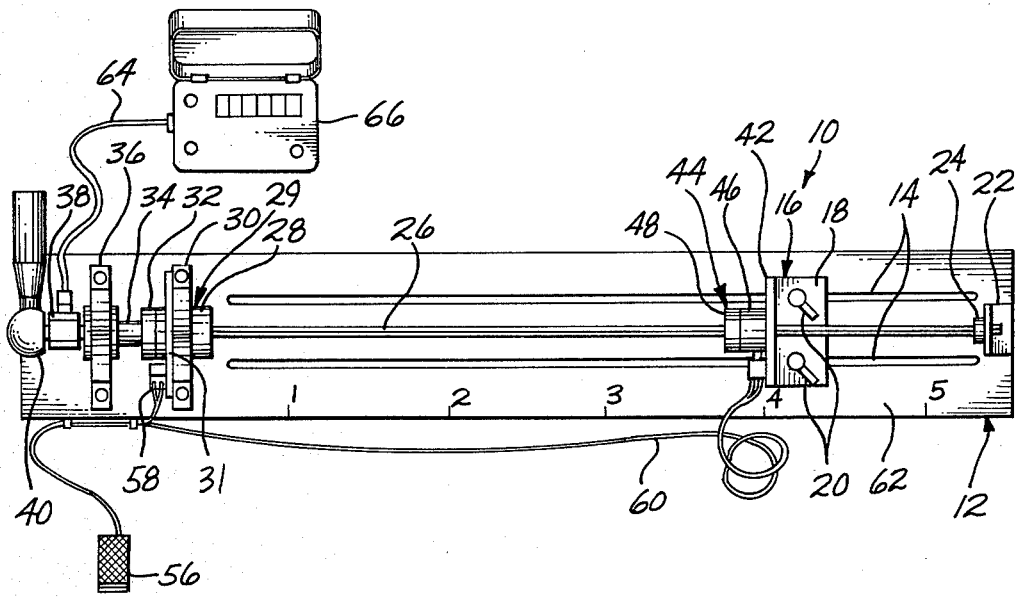
FIG. 2 shows a plan view of the drawing of FIG. 1.

FIGS. 3 and 4 show a different embodiment of the certification device 10. This unit differs in that it has two torsion bars 26a and 26b which are placed side by side and parallel to each other. These torsion bars extend axially through the hubs 68a and 68b of freely rotatable and mating gears mounted in a movable support member 16a. The bars are mounted so that the hubs slide along the bars, and are shaped so that the bars and hubs rotate as one. With this arrangement the two torsion bars act together to provide an effective torsion bar length. Clutch 44a is secured to support member 70. The other elements with a number followed by a letter serve in the same manner as the numbered units in FIGS. 1 and 2.

In operation the movable support member 16a is moved to the numbered location to provide the desired effective torsion bar length for the "Joint Rate" desired. The nutrunner 40a is set for what is believed to be the correct torque and the nutrunner placed to drive shaft 34a and rotate the drive part 32a of single direction of rotation clutch 30a. Switch 56a is actuated which first energizes clutch 44a to hold the end of torsion bar 26b stationary, then clutch 30a is energized to apply torque to torsion bar 26a until the nutrunner turns off. The applied torque is read on instrument 66a. If that gives the proper torque for the required "Joint Rate," the nutrunner is ready for use. If it does not give the correct torque, the nutrunner torque is adjusted in the desired direction, and the process repeated until the nutrunner does supply the desired torque for that "Joint Rate."

I claim:

1. A torque measuring device for variable joints comprising: a torsion bar means having means for adjusting the effective length of the bar means, means for rapidly introducing and maintaining torque from a torque controlled winding tool into the torsion bar means, for measuring the torque applied to the bar means, means for releasing the torque build-up on the torsion bar means, and the torsion bar means further comprises: a pair of spaced apart torsion bars geared together for simultaneous and matching torsional build-up.

2. A torque measuring device for variable joints comprising: a torsion bar means, a clutch rotatable in only one direction on one end of the torsion bar means, a connection for a torque controlled winding tool for driving the clutch, means for adjusting the effective length of the torsion bar means, which bar means further comprises a pair of spaced apart torsion bars geared together for simultaneous and matching torsional build-up, means for measuring the torque applied to the bar means, and means for releasing the torque build-up on the bar means.

3. A torque measuring device for variable joints comprising: a torsion bar, a clutch rotatable in only one direction and joined for driving one end of the torsion bar, a two part coupling with one part joined to a sliding support which is adjustable at various positions from the opposite end of the torsion bar, and a second part slidably joined to the torsion bar, means for joining selectively the two parts of the coupling, means for introducing torque from a torque controlled winding tool through the clutch and into the torsion bar, means for measuring the torque applied to the torsion bar, and means for releasing the torque built up in the torsion bar.

4. A torque measuring device for variable joints as in claim 3 wherein the coupling is a second clutch, and the means for joining the two parts of the coupling comprises energizing that clutch.

5. A torque measuring device for variable joints as in claim 4 wherein the means for releasing the torque build-up on the torsion bar comprises de-energizing the second clutch.

6. A torque measuring device for variable joints comprising: a reciprocally adjustable support member containing a pair of mating gears, a pair of torsion bars mounted parallel to each other with the bars slidingly mounted in the axis of the gears, a clutch that is rotatable in only one direction mounted to the end of one of the torsion bars, a second clutch mounted to an end of the other torsion bar, a fastener for accepting a torque controlled winding tool located to drive the first clutch, means for determining the torque on the torsion bar, and means for controlling the clutches to rapidly introduce the torque into the torsion bar and for releasing the torque from the torsion bar once the torque is determined.

* * * * *